United States Patent
Florczak

(10) Patent No.: US 11,353,539 B2
(45) Date of Patent: Jun. 7, 2022

(54) SYSTEM FOR POSITIONING ANIMAL TAGS, METHOD OF DETERMINING A LOCATION OF AN INTERMEDIATE BASIS STATION AND A COMPUTER PROGRAM THEREFOR

(71) Applicant: DELAVAL HOLDING AB, Tumba (SE)

(72) Inventor: Keld Florczak, Tumba (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 17/057,505

(22) PCT Filed: May 20, 2019

(86) PCT No.: PCT/SE2019/050460
§ 371 (c)(1),
(2) Date: Nov. 20, 2020

(87) PCT Pub. No.: WO2019/226104
PCT Pub. Date: Nov. 28, 2019

(65) Prior Publication Data
US 2021/0208234 A1    Jul. 8, 2021

(30) Foreign Application Priority Data

May 23, 2018 (SE) .................................. 1850609-7

(51) Int. Cl.
*G01S 5/14* (2006.01)
*G01S 5/02* (2010.01)
*A01K 11/00* (2006.01)

(52) U.S. Cl.
CPC ........ *G01S 5/02216* (2020.05); *A01K 11/006* (2013.01); *G01S 5/14* (2013.01)

(58) Field of Classification Search
CPC ......... G01S 5/02216; G01S 5/14; G01S 5/163
(Continued)

(56) References Cited

U.S. PATENT DOCUMENTS

2005/0228613 A1   10/2005   Fullerton et al.
2010/0013712 A1   1/2010    Yano
(Continued)

FOREIGN PATENT DOCUMENTS

CN    107 817 469         3/2018
DE    102017214889 A1 *   2/2019
(Continued)

OTHER PUBLICATIONS

International Search Report for PCT/SE2019/050460 dated Sep. 3, 2019, 3 pages.
(Continued)

*Primary Examiner* — Harry K Liu
(74) *Attorney, Agent, or Firm* — Nixon & Vanderhye

(57) ABSTRACT

Anchor base stations are arranged around an area in which positions for radio transmitter tags are to be determined. The anchor base stations have known locations, and the location of an intermediate base station added to the system is determined by: arranging the intermediate base station between first and second anchor base stations; determining, based on propagation-delay measurements of a signal emitted by the intermediate base station and using the global time reference a first calculated distance between the first anchor base station and the intermediate base station, and a second calculated distance between the second anchor base station and the intermediate base station (BSI5); obtaining an elevation indicator specifying whether the intermediate base station is located in level with, above or below the common plane; and determining the location of the intermediate base station based on the first and second calculated distances and the elevation indicator.

18 Claims, 3 Drawing Sheets

(58) Field of Classification Search
USPC .......................................................... 342/462
See application file for complete search history.

(56) References Cited

U.S. PATENT DOCUMENTS

| | | |
|---|---|---|
| 2011/0028166 A1 | 2/2011 | Ketchum et al. |
| 2011/0119024 A1* | 5/2011 | Nam ..................... G01S 5/021 |
| | | 702/150 |
| 2015/0094081 A1 | 4/2015 | Gupta et al. |
| 2017/0026787 A1 | 1/2017 | Chow et al. |
| 2018/0136307 A1 | 5/2018 | Turner et al. |

FOREIGN PATENT DOCUMENTS

| | | |
|---|---|---|
| GB | 2497802 | 6/2013 |
| WO | 01/46711 | 6/2001 |
| WO | 2008/118621 | 10/2008 |
| WO | 2012/003411 | 1/2012 |
| WO | 2014/067896 A1 | 5/2014 |
| WO | 2014/067897 A1 | 5/2014 |
| WO | 2017/131575 | 8/2017 |
| WO | WO-2019219495 A1 * | 11/2019 ............. G01S 19/42 |

OTHER PUBLICATIONS

Written Opinion of the ISA for PCT/SE2019/050460 dated Sep. 3, 2019, 8 pages.
Swedish Search Report for SE-1850609-7 dated May 23, 2018, 3 pages.

* cited by examiner

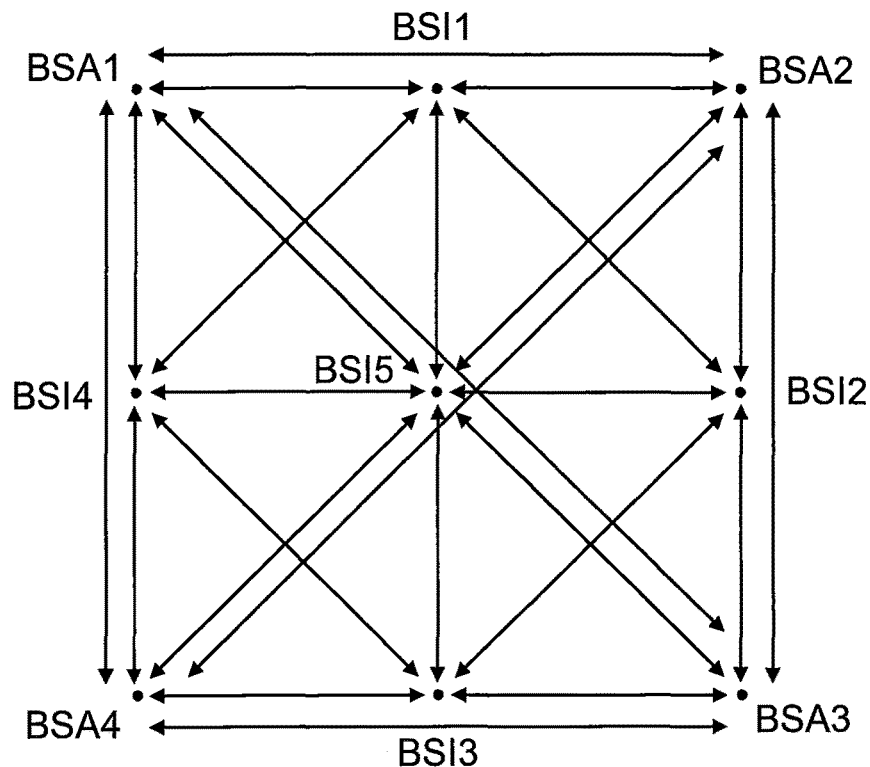
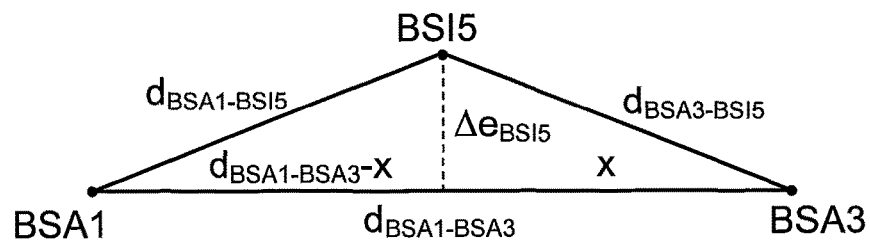
Fig. 4
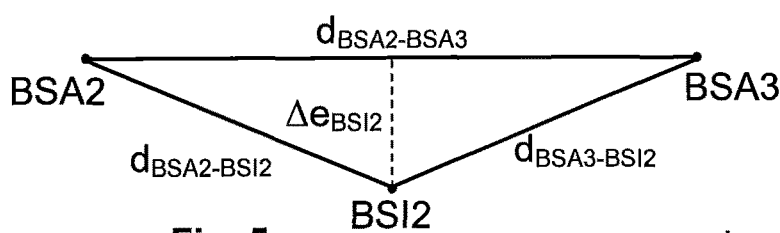
Fig. 5
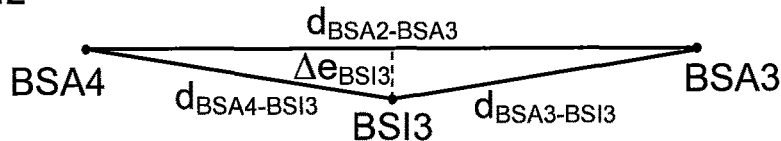
Fig. 6
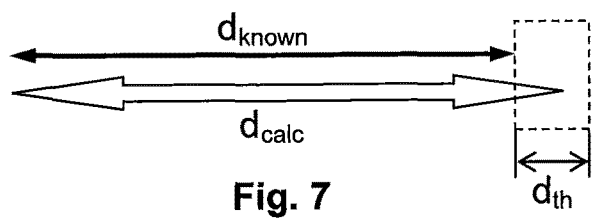
Fig. 7

SYSTEM FOR POSITIONING ANIMAL TAGS, METHOD OF DETERMINING A LOCATION OF AN INTERMEDIATE BASIS STATION AND A COMPUTER PROGRAM THEREFOR

This application is the U.S. national phase of International Application No. PCT/SE2019/050460 filed May 20, 2019 which designated the U.S. and claims priority to SE Patent Application No. 1850609-7 filed May 23, 2018, the entire contents of each of which are hereby incorporated by reference.

TECHNICAL FIELD

The present invention relates generally to keeping track of the individuals in a group of animals. More particularly, the invention relates to a system of positioning animal tags and a method of determining a location of an intermediate base station added to such a system. The invention also relates to a computer program and a non-volatile data carrier.

BACKGROUND

For animal-health reasons and to maintain high quality and efficiency in animal-based food production it is important that the physical status of livestock animals can be monitored in a convenient and reliable manner. This, in turn, requires that the movements of the animals can be tracked continuously.

WO 2014/067896 and WO 2014/067897 describe systems for measuring real time positions of a plurality of animals carrying radio transmitter tags. Inputs from a plurality of sensors are received, and the actual positions of the animals are calculated based on measurements of delay in radio communication. Thus, for example the behavior of each animal can be analyzed. Calibration is performed via communication between the sensors and a plurality of fixed reference tags. Thereby, the animals can be positioned with good accuracy.

However, setting up the sensor system requires considerable efforts to ensure that the position of each sensor is known with sufficient precision.

SUMMARY

The object of the present invention is to offer a resourceful positioning system, which is easy to install and straightforward to expand if needed, for example to cover a larger area and/or to improve the positioning quality.

According to one aspect of the invention, the object is achieved by a system for positioning animal tags, which system has a central control unit and a set of at least three anchor base stations whose respective positions are known. The system also includes a clock-signal source configured to provide a global time reference to the central control unit and the anchor base stations. In addition to positioning animal tags, the system is adapted to determine a location of an intermediate base station that is added to the system. Such an expansion is effected as follows. The anchor base stations are presumed to be located in a common plane. The anchor base stations are further arranged in a frame around an area in which positions for animal tags are to be determined based on propagation-delay measurements of signals emitted by the animal tags using the global time reference. The central control unit is configured to receive a notification that the intermediate base station has been arranged between first and second anchor base stations in such a manner that in a projection onto the common plane the intermediate base station is located on a straight line between the first and second anchor base stations. In response to the notification, the central control unit is configured to determine a first calculated distance between the first anchor base station and the intermediate base station; and a second calculated distance between the second anchor base station and the intermediate base station. The first and second calculated distances are determined based on propagation-delay measurements of a signal emitted by the intermediate base station and by using the global time reference. The central control unit is configured to obtain an elevation indicator specifying whether the intermediate base station is located in, above, or below the common plane. Based on the first and second calculated distances and the elevation indicator, the central control unit is configured to determine the location of the intermediate base station.

This system is advantageous because enables addition of new base stations in a convenient and very straightforward manner.

According to one embodiment of this aspect of the invention, the central control unit is configured to determine the location of the intermediate base station by calculating a deviation distance from the common plane using the first and second calculated distances, a known reference distance between the first and second anchor base stations, the elevation indicator and by applying the Pythagorean theorem. This renders the addition of intermediate base stations exceptionally uncomplicated from a user perspective. For example, if first and second anchor base stations are arranged in respective lower ends of a pair of roof beams, the farmer can simply add an intermediate base station at the ridge beam where the roof beams interconnect, input an elevation indicator specifying "above", and let the central control unit determine the exact spatial coordinates for the intermediate base station automatically.

According to another embodiment of this aspect of the invention, the central control unit is configured to add the first and second calculated distances to one another to obtain an overall calculated distance; and compare the overall calculated distance with a known reference distance between the first and second anchor base stations. If the overall calculated distance exceeds the known reference distance by less than a threshold distance, the central control unit is configured to determine the elevation indicator to specify that the intermediate base station is located in the common plane. Hence, in an essentially flat ceiling, intermediate base stations can be arranged without manually entering the elevation indicator.

According to yet another embodiment of this aspect of the invention, if the elevation indicator specifies that the intermediate base station is located in the common plane, the central control unit is configured to determine the location of the intermediate base station based on (a) the known location of one of the first and second anchor base stations, and (b) the first or second calculated distance between the intermediate base station and said one of the first and second anchor base stations. Of course, this is a very simple procedure to implement.

According to another embodiment of this aspect of the invention, the central control unit is communicatively connected to a user interface. Here, if the overall calculated distance exceeds the known reference distance by at least the threshold distance, the central control unit is configured to prompt an operator, via the user interface, to enter input data reflecting whether the intermediate base station is located above or below the common plane. Typically, it is trivial for the operator to establish that the intermediate base station is either located above the anchor base station plane (e.g. in a ridge beam) or below the same.

According to another aspect of the invention, the object is achieved by a method of determining a location of an intermediate base station added to a system for positioning animal tags. The system contains a central control unit and a set of at least three anchor base stations whose respective positions are known. The anchor base stations are presumed to be located in a common plane. The anchor base stations are further arranged in a frame around an area in which positions for animal tags are to be determined based on propagation-delay measurements of signals emitted by the animal tags using a global time reference. The method involves checking if a notification has been received, which notification indicates that the intermediate base station has been arranged between first and second anchor base stations of the anchor base stations in such a manner that in a projection onto the common plane the intermediate base station is located on a straight line between the first and second anchor base stations. If the notification has been received, the method further involves determining a first calculated distance between the first anchor base station and the intermediate base station; and a second calculated distance between the second anchor base station and the intermediate base station. The first and second calculated distances are determined based on propagation-delay measurements of a signal emitted by the intermediate base station and using the global time reference. The method further involves obtaining an elevation indicator specifying whether the intermediate base station is located in, above or below the common plane; and determining the location of the intermediate base station based on the first and second calculated distances and the elevation indicator. The advantages of this method, as well as the preferred embodiments thereof, are apparent from the discussion above with reference to the control unit.

According to a further aspect of the invention, the object is achieved by a computer program loadable into a non-volatile data carrier communicatively connected to a processing unit. The computer program includes software for executing the above method when the program is run on the processing unit.

According to another aspect of the invention, the object is achieved by a non-volatile data carrier containing the above computer program.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

FIG. 3 shows one example of how anchor base stations and intermediate base stations may be arranged according to one embodiment of the invention;

FIGS. 4-6 exemplify different elevation relationships between the anchor base stations and the intermediate base stations according to embodiments of the invention;

FIG. 7 illustrates how an overall calculated distance between first and second anchor base stations is compared to a known reference distance according to one embodiment of the invention.

DETAILED DESCRIPTION

Figure 1:
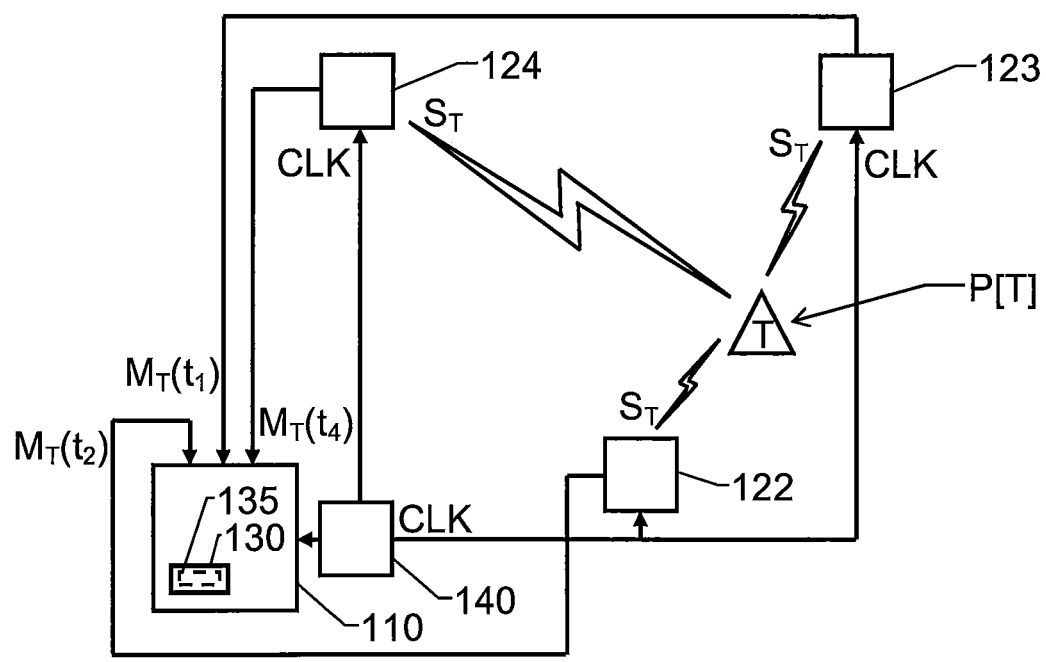
FIG. 1 Illustrates schematically how an animal tag is positioned by a system of base stations.

In FIG. 1, we see a schematic illustration of a system for positioning animal tags T according to one embodiment of the invention. The system includes a central control unit 110 and a set of base stations 122, 123 and 124 respectively. Each base station in the set of base stations is configured to receive a global time reference CLK, for example in the form of a clock signal from the central control unit 110. Thereby, all base stations share a common time basis that enables determining propagation delays in radio signals that have been received by two or more of the base stations.

Each base station in the set of base stations 122, 123 and 124 is also configured to receive a respective radio tag signal $S_T$ that has been transmitted from at least one animal tag T. Each of these radio tag signals $S_T$ contains an identifier uniquely identifying the respective animal tag T. Thereby, the radio tag signals $S_T$ can be distinguished from one another upon receipt in the base stations.

Each base station in the set of base stations 122, 123 and 124 is also configured to forward a respective tag message $M_T(t_2)$, $M_T(t_3)$ and $M_T(t_4)$ to the central control unit 110. The tag messages $M_T(t_2)$, $M_T(t_3)$ and $M_T(t_4)$ describe each of any received radio tag signals $S_T$. In the example illustrated in FIG. 1, the animal tag T is located a relatively short distance from a base station 122, a relatively long distance from a base station 124 and at an intermediate distance from a base station 123. Consequently, the radio tag signals $S_T$ will reach the base station 122 at a first point in time $t_1$, the base station 123 at a second point in time $t_2$, and the base station 124 at a third point in time $t_3$, where the first, second and third points in time occur in the temporal order $t_1$, $t_2$ and $t_3$. The tag messages $M_T(t_2)$, $M_T(t_3)$ and $M_T(t_4)$ reflect the first, second and third points in time $t_1$, $t_2$ and $t_3$ respectively.

The central control unit 110 is configured to receive the tag messages $M_T(t_2)$, $M_T(t_3)$ and $M_T(t_4)$, and based thereon determine a position P[T] for the animal tag T. This determination is made by analyzing the radio tag signal ST having been received by at least three base stations, here 122, 123 and 124.

Preferably, the central control unit 110 is configured to determine the position of the animal tag T based on triangulation by using the tag messages $M_T(t_2)$, $M_T(t_3)$ and $M_T(t_4)$. Namely, each tag message $M_T(t_2)$, $M_T(t_3)$ and $M_T(t_4)$ contains an indication of the propagation delay radio tag signal $S_T$ to the base station in question, and thus a distance measure between the animal tag T and this base station. Assuming that the respective position of each of said base stations 122, 123 and 124 is known, it is straightforward to determine the position P[T] for the animal tag T.

Figure 2:
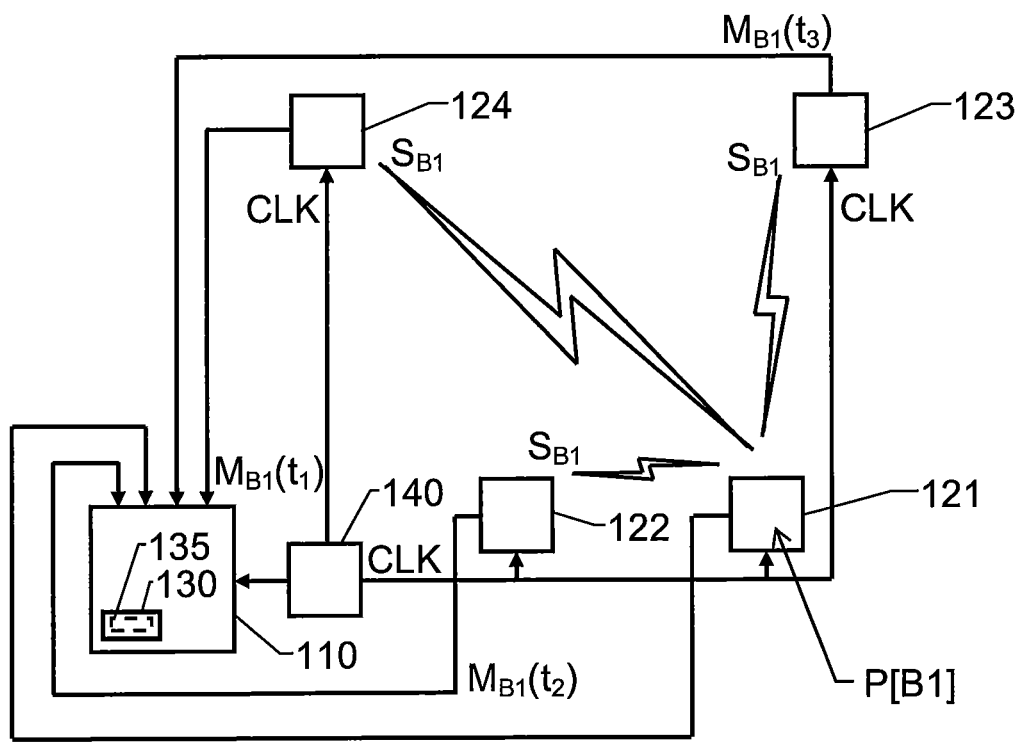
FIG. 2 Illustrates schematically how the location of an added base station may be determined in the general case.

Referring now to FIG. 2, we will explain how the location of a base station 121 added to the system can be determined in the general case, i.e. when no specific conditions apply as to where the added base station 121 is placed relative to the existing base stations 122, 123 and 124 respectively.

Analogous to above, we assume that the respective positions of the base stations 122, 123 and 124 are known. However, the base station 121 is a newly added resource whose exact location is to be determined. To this aim, each base station 121, 122, 123 and 124 is configured to transmit a respective radio base signal containing an identifier uniquely identifying the base station. FIG. 2 shows one such radio base signal $S_{B1}$ transmitted from the base station 121, and thus containing an identifier uniquely identifying the base station 121.

Each base station is configured to receive radio base signals from other base stations in the system, i.e. here the base station 122 is configured to receive radio base signals from the base stations 121, 123 and 124; the base station 123 is configured to receive radio base signals from the base stations 121, 122 and 124; the base station 124 is configured to receive radio base signals from the base stations 121, 122 and 123; the base station 121 is configured to receive radio base signals from the base stations 122, 123 and 124. Moreover, each base station is configured to forward a base station message describing any received radio base signal to the central control unit 110. In the example shown in FIG. 2, the base station messages $M_{B1}(t_2)$, $M_{B1}(t_3)$ and $M_{B1}(t_4)$ describing the radio base signal $S_{B1}$ are forwarded from the base stations 122, 123 and 124 to the central control unit 110.

The central control unit 110, in turn, is configured to receive base station messages describing radio base signals, and based thereon determine positions for the base stations concerned. A condition for this is that base station messages from a given base station, say 121, have been received by at least three other base stations. In FIG. 2, the central control unit 110 receives the base station messages $M_{B1}(t_1)$, $M_{B1}(t_2)$ and $M_{B1}(t_3)$ describing the radio base signal $S_{B1}$ from the added base station 121. Based thereon, the central control unit 110 determines a location P[B1] for the base station 121 using triangulation and a respective known position for each of said at least three base stations 122, 123 and 124 analogous to what is described above referring to determining the position P[T] for the animal tag T.

According to one embodiment of the invention, the base stations 121, 122, 123 and 124 are configured to transmit the radio base signals repeatedly, i.e. not only when a new base station is added to the system.

The central control unit 110 is further configured to determine a respective updated location P[B1] for a particular base station, e.g. 121, in response to receiving a new radio base signal $SB_1$ from that base station 121. Analogous to the above, a condition for this is that the new radio base signal $SB_1$ has been received by at least three other base stations in the system, such as 122, 123 and 124.

According to the invention, a simplified procedure is proposed for determining the location of an added base station when there are certain spatial interrelationships between the existing base stations and the added base station. In this scenario, the system contains base stations of at least two different categories, namely anchor base stations and at least one intermediate base station. FIG. 3 shows an example configuration, where anchor base stations BSA1, BSA2 and BSA3, BSA4 are arranged in a frame around an area in which positions for animal tags T are to be determined. The anchor base stations BSA1, BSA2, BSA3 and BSA4 are located in a common plane. Typically, this means that they all have the same elevation relative to a reference plane, e.g. the ground or the floor of a barn.

In FIG. 3, the at least one intermediate base station is represented by BSI1, BSI2, BSI3, BSI4 and BSI5. An intermediate base station is defined as a base station being arranged between two base stations in the set of anchor base stations, i.e. here BSA1, BSA2, BSA3 and BSA4. An intermediate base station may either be located in the common plane of the anchor base stations, or outside this plane. For instance, BSI1 and BSI4 may be located in the common plane, while BSI2, BSI3 and BSI5 may be located outside the common plane.

Below, we will explain how an intermediate base station, say BSI5, is added to the system for positioning animal tags T according to the invention.

As stated above, the system contains a central control unit 110. The system further includes a set of at least three anchor base stations BSA1, BSA2, BSA3 and BSA4 whose respective positions are known. The system also contains a clock-signal source 140 configured to provide a global time reference CLK to the central control unit 110, the anchor base stations BSA1, BSA2, BSA3 and BSA4 as well as any intermediate base station BSI1, BSI2, BSI3, BSI4 and/or BSI5 added to the system.

It is presumed that the anchor base stations BSA1, BSA2, BSA3 and BSA4 are arranged in a frame around an area in which positions for animal tags T are to be determined based on propagation-delay measurements of signals emitted by the animal tags T using the global time reference CLK.

The central control unit 110 is configured to receive a notification that the added intermediate base station BSI5 has been arranged between first and second anchor base stations, here exemplified by BSA1 and BSA3. The intermediate base station BSI5 is arranged such that in a projection onto the common plane, the intermediate base station BSI5 is located on a straight line between the first and second anchor base stations BSA1 and BSA3.

We now refer FIG. 4, which shows the anchor base stations BSA1 and BSA3 and the intermediate base station BSI5 seen from a view perpendicular to the view represented in FIG. 3.

In response to the above-mentioned notification, the central control unit 110 is configured to determine a first calculated distance $d_{BSA1-BSI5}$ between the first anchor base station BSA1 and the intermediate base station BSI5, and a second calculated distance $d_{BSA3-BSI5}$ between the second anchor base station BSA3 and the intermediate base station BSI5. Analogous to the above, the first and second calculated distances $d_{BSA1-BSI5}$ and $d_{BSA3-BSI5}$ are determined based on propagation-delay measurements of a signal emitted by the intermediate base station BSI5 and by using the global time reference CLK.

The central control unit 110 is further configured to obtain an elevation indicator specifying whether the intermediate base station BSI5 is located in the common plane, above the common plane, or below the common plane. Hence, the elevation indicator may be expressed by a ternary variable.

Finally, the central control unit 110 is configured to determine the location of the intermediate base station BSI5 based on the first and second calculated distances $d_{BSA1-BSI5}$ and $d_{BSA3-BSI5}$, and the elevation indicator.

According to one embodiment of the invention, the central control unit 110 is configured to determine the location of the intermediate base station BSI5 by calculating a deviation distance $\Delta e_{BSI5}$ from the common plane using the first and second calculated distances $d_{BSA1-BSI5}$ and $d_{BSA3-BSI5}$, a known reference distance $d_{BSA1-BDA3}$ between the first and second anchor base stations BSA1 and BSA3, the elevation indicator and by applying the Pythagorean theorem. Specifically, the deviation distance $\Delta e_{BSI5}$ may be determined as follows.

Let x denote the unknown distance from the second anchor base station BSA3 to the point straight below the intermediate base station BSI5, i.e. where the deviation distance $\Delta e_{BSI5}$ is measured. Then, the remaining distance from said point to the first anchor base station BSA1 becomes $d_{BSA1-BDA3}-X$. The Pythagorean theorem gives us the equations:

$$(d_{BSA1-BDA3}-x)^2 + \Delta e_{BSI5}^2 = d_{BSA1-BSI5}^2 \text{ and} \quad (1.1)$$

$$\Delta e_{BSI5}^2 + x^2 = d_{BSA3-BSI5}^2 \text{ respectively.} \quad (1.2)$$

Solving $\Delta e_{BSI5}$ in equations 1.1 and 1.2 gives:

$$\Delta e_{BSI5} = \sqrt{d_{BSA3-BSI5}^2 - \frac{(d_{BSA1-BSA3}^2 + d_{BSA3-BSI5}^2 - d_{BSA1-BSI5}^2)^2}{4 d_{BSA1-BSA3}^2}}.$$

Referring now to FIG. 7, according to one embodiment of the invention, the central control unit 110 is configured to add the first and second calculated distances $d_{BSA1-BSI5}$ and $d_{BSA3-BSI5}$ to one another to obtain an overall calculated distance $d_{calc}$. The central control unit 110 is then configured to compare the overall calculated distance $d_{calc}$ with a known reference distance $d_{known}$ between the first and second anchor base stations BSA1 and BSA3, i.e. in FIG. 4, $d_{known}=d_{BSA1-BSA3}$.

If the overall calculated distance $d_{calc}$ exceeds the known reference distance $d_{known}$ by less than a threshold distance $d_{th}$, the central control unit 110 is configured to determine the elevation indicator to specify that the intermediate base station BSI5 is located in the common plane. In other words, if $$d_{calc} - d_{known} < d_{th} \quad (1.3)$$

the deviation distance is approximated to zero.

FIG. 6 exemplifies such a situation, where an intermediate base station BSI3 is located below the common plane, namely the plane one including the anchor base stations BSA3 and BSA4 respectively. Here, the anchor base stations BSA3 and BSA4 are separated from one another by an overall distance $d_{BSA3-BSA4}$, a first sub distance between the anchor base station BSA3 and the intermediate base station BSI3 is $d_{BSA3-BSI3}$ and a second sub distances between the anchor base station BSA4 and the intermediate base station BSI3 is $d_{BSA4-BSI3}$. The deviation distance $\Delta e_{BSI3}$ from the common plane to the intermediate base station BSI3 is approximated to zero according to 1.3. Therefore, the elevation indicator is set to specify that the intermediate base station is BSI3 located in the common plane.

If the elevation indicator specifies that the intermediate base station is located in the common plane, the central control unit 110 is preferably configured to apply a simplified procedure for determining the location of the intermediate base station, namely as follows.

The central control unit 110 is configured to determine the location of the intermediate base station BSI3 based on the known location of one of the first or second anchor base stations BSA4 or BSA3, and the first or second calculated distance $d_{BSA4-BSI3}$ and $d_{BSA3-BSI3}$ between the intermediate base station BSI3 and said one of the first or second anchor base stations BSA4, or BSA3. Thus, the Pythagorean theorem is not required here.

If, however, $d_{calc} - d_{known} \geq d_{th}$ it is preferable that the central control unit 110 is communicatively connected to a user interface through which an operator may enter input data to the central control unit 110. If the overall calculated distance $d_{calc}$ exceeds the known reference distance $d_{known}$ by at least the threshold distance $d_{th}$, the central control unit 110 is configured to prompt the operator, via the user interface, to enter input data reflecting whether the intermediate base station BSI5 is located above or below the common plane.

The central control unit 110 is configured to obtain an overall distance $d_{BSA1-BSA3}$ between the anchor base stations BSA1 and BSA3, either from a database or by the investigation 1.3 above. The central control unit 110 is further configured to calculate a first sub distance $d_{BSA1-BSI5}$ between the first anchor base station BSA3 and the intermediate base station BSI5; and calculate a second sub distance $d_{BSA3-BSI5}$ between the second anchor base BSA3 station and the intermediate base station BSI5. The first and second sub distances $d_{BSA1-BSI5}$ and $d_{BSA3-BSI5}$ are likewise calculated by receiving base station messages from the intermediate base station BSI1 in base stations whose locations are already known.

FIG. 5 shows one example illustrating that the intermediate base station BSI2 is located a deviation $\Delta e_{BSI2}$ below the common plane in which the anchor base stations BSA2 and BSA3 are located. The anchor base stations BSA2 and BSA3 are separated from one another by an overall distance $d_{BSA2-BSA3}$, a first sub distance between the anchor node BSA2 and the intermediate node BSI2 is $d_{BSA2-BSI2}$ and a second sub distance between the anchor node BSA3 and the intermediate node BSI2 is $d_{BSA3-BSI2}$.

It is generally advantageous if the processing unit 120 is configured to effect the above-mentioned procedure in an automatic manner by executing a computer program 135. Therefore, the processing unit 120 may include a memory unit, i.e. non-volatile data carrier 130, storing the computer program 135, which, in turn, contains software for making processing circuitry in the form of at least one processor in the processing unit 120 execute the above-described actions when the computer program 135 is run on the at least one processor.

Figure 8:
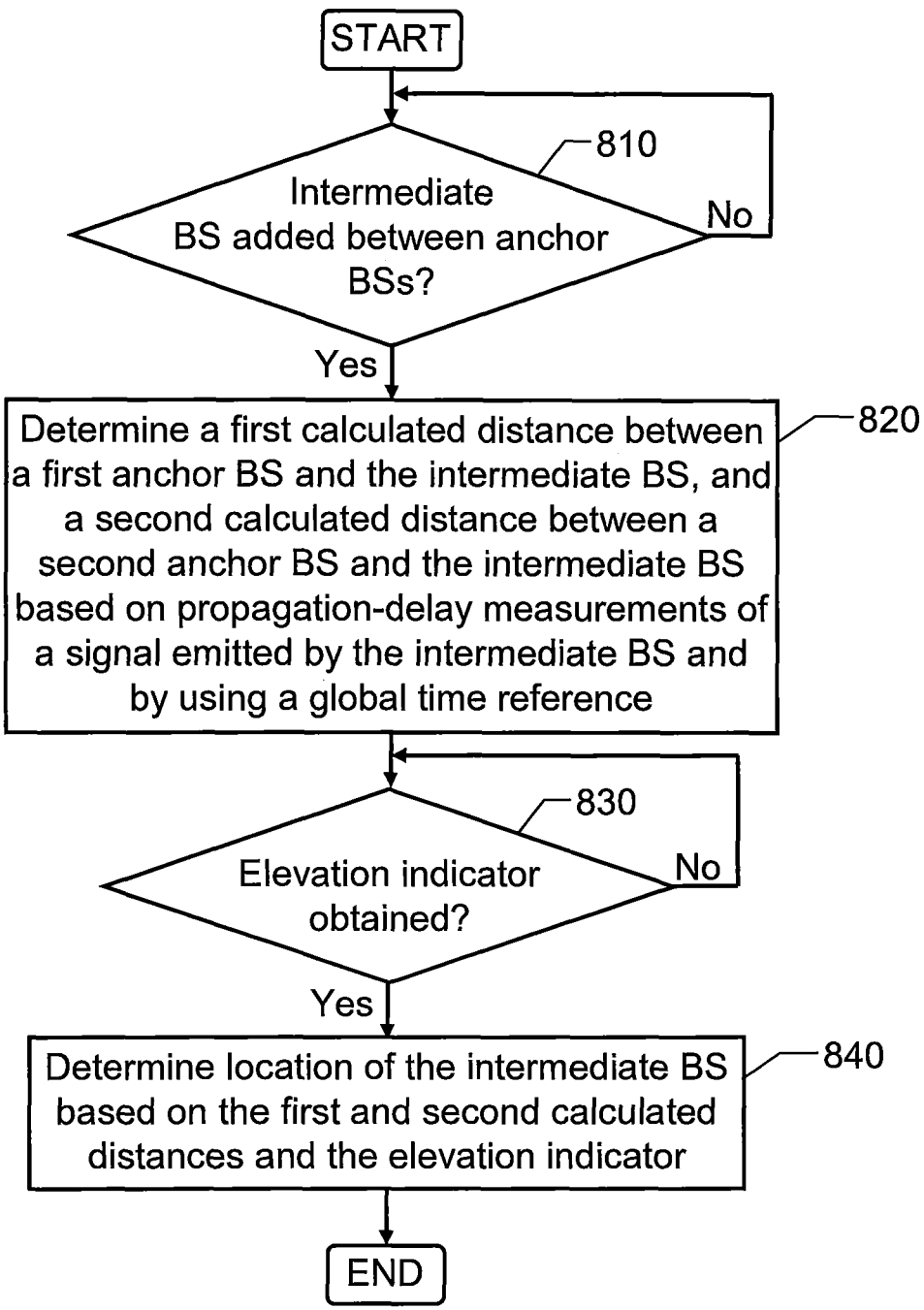
FIG. 8 illustrates, by means of a flow diagram, the general method according to the invention.

In order to sum up, and with reference to the flow diagram in FIG. 8, we will now describe the general method according to the invention for determining a location for an intermediate base station added to an system for positioning animal tags.

In a first step 810, it is checked if a notification has been received, which notification indicates that an intermediate base station has been added to the system and is arranged between first and second anchor base stations in such a manner that in a projection onto the common plane of the anchor base stations, the intermediate base station is located on a straight line between the anchor base stations. If the check in step 810 is answered in the negative, the procedure loops back and stays in in step 810.

If the check in step 810 is answered in the positive, a step 820 follows in which first and second calculated distances are determined based on propagation-delay measurements of a signal emitted by the intermediate base station and using the global time reference CLK of the positioning system. More precisely, the first calculated distance between the first anchor base station and the intermediate base station is determined, and the second calculated distance between the second anchor base station and the intermediate base station is determined.

Thereafter, in a step 830, it is checked if the elevation indicator has been obtained, either through the above automatic investigation 1.3, or via the user interface. The elevation indicator specifies whether the intermediate base station is located in, above or below the common plane. If the elevation indicator is obtained, a step 840 follows; and otherwise the procedure loops back and stays in step 830.

In step 840, the location of the intermediate base station is determined based on the first and second calculated distances and the elevation indicator. Thereafter, the procedure ends.

All of the process steps, as well as any sub-sequence of steps, described with reference to FIG. 8 may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal, which may be conveyed via electrical or optical cable or by, radio or by other means. When the program is embodied in a signal, which may be conveyed, directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

Although the invention is primarily intended to determine the positions of milk-producing animals, e.g. cows, the proposed solution is equally well applicable for any other kind of livestock or wild animals.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A system for positioning radio transmitter tags (T), the system comprising:
a central control unit (110),
a set of at least three anchor base stations (BSA1, BSA2, BSA3, BSA4) whose respective positions are known,
a clock-signal source (140) configured to provide a global time reference (CLK) to the central control unit (110) and to the set of at least three anchor base stations (BSA1, BSA2, BSA3, BSA4), and
an intermediate base station (BSI1, BSI2, BSI3, BSI4, BSI5),
wherein the system is configured to determine a location of the intermediate base station (BSI1, BSI2, BSI3, BSI4, BSI5) when the intermediate base station (BSI1, BSI2, BSI3, BSI4, BSI5) is added to the system of the set of at least three anchor base stations (BSA1, BSA2, BSA3, BSA4), wherein,
the set of at least three anchor base stations (BSA1, BSA2, BSA3, BSA4) are arranged in a frame around an area in which positions for radio transmitter tags (T) are to be determined based on propagation-delay measurements of signals emitted by the radio transmitter tags (T) using the global time reference (CLK), the anchor base stations being located in a common plane, and
the central control unit (110) is configured to:
receive a notification that the intermediate base station (BSI5) has been arranged between first and second anchor base stations (BSA1, BSA3) of said set of at least three anchor base stations, such that in a projection onto the common plane, the intermediate base station (BSI5) is located on a straight line between the first and second anchor base stations (BSA1, BSA3), and
in response to the notification, determine, based on propagation-delay measurements of a signal emitted by the intermediate base station (BSI5) and by using the global time reference (CLK), a first calculated distance ($d_{BSA1\text{-}BSI5}$) between the first anchor base station (BSA1) and the intermediate base station (BSI5), and a second calculated distance ($d_{BSA3\text{-}BSI5}$) between the second anchor base station (BSA3) and the intermediate base station (BSI5);
obtain an elevation indicator specifying whether the intermediate base station (BSI5) is located in the common plane, above the common plane, or below the common plane, and
determine the location of the intermediate base station (BSI5) based on the first and second calculated distances ($d_{BSA1\text{-}BSI5}$; $d_{BSA3\text{-}BSI5}$) and the elevation indicator.

2. The system according claim 1, wherein the central control unit (110) is configured to determine the location of the intermediate base station (BSI5) by calculating a deviation distance ($\Delta e_{BSI5}$) from the common plane using the first and second calculated distances ($d_{BSA1\text{-}BSI5}$; $d_{BSA3\text{-}BSI5}$), a known reference distance ($d_{BSA1\text{-}BDA3}$) between the first and second anchor base stations (BSA1, BSA3), the elevation indicator and by applying the Pythagorean theorem.

3. The system according to claim 2, wherein the central control unit (110) is configured to:
add the first and second calculated distances ($d_{BSA1\text{-}BSI5}$; $d_{BSA3\text{-}BSI5}$) to one another to obtain an overall calculated distance ($d_{calc}$); and
compare the overall calculated distance ($d_{calc}$) with a known reference distance ($d_{known}$) between the first and second anchor base stations (BSA1, BSA3) and when the overall calculated distance ($d_{calc}$) exceeds the known reference distance by less than a threshold distance ($d_{th}$), determine the elevation indicator to specify that the intermediate base station (BSI5) is located in the common plane.

4. The system according to claim 3, wherein when the elevation indicator specifies that the intermediate base station (BSI5) is located in the common plane, the central control unit (110) is configured to determine the location of the intermediate base station (BSI5) based on the known location of one of the first and second anchor base stations (BSA1, BSA3) and the first or second calculated distance ($d_{BSA1\text{-}BSI5}$; $d_{BSA3\text{-}BSI5}$) between the intermediate base station (BSI5) and said one of the first and second anchor base stations (BSA1, BSA3).

5. The system according to claim 1, wherein the central control unit (110) is configured to:
   add the first and second calculated distances ($d_{BSA1-BSI5}$; $d_{BSA3-BSI5}$) to one another to obtain an overall calculated distance ($d_{calc}$);
   compare the overall calculated distance ($d_{calc}$) with a known reference distance ($d_{known}$) between the first and second anchor base stations (BSA1, BSA3) and when the overall calculated distance ($d_{calc}$) exceeds the known reference distance by less than a threshold distance ($d_{th}$), determine the elevation indicator to specify that the intermediate base station (BSI5) is located in the common plane.

6. The system according to claim 5, wherein when the elevation indicator specifies that the intermediate base station (BSI5) is located in the common plane, the central control unit (110) is configured to determine the location of the intermediate base station (BSI5) based on the known location of one of the first and second anchor base stations (BSA1, BSA3) and the first or second calculated distance ($d_{BSA1-BSI5}$; $d_{BSA3-BSI5}$) between the intermediate base station (BSI5) and said one of the first and second anchor base stations (BSA1, BSA3).

7. The system according to claim 5, wherein the central control unit (110) is communicatively connected to a user interface, and when the overall calculated distance ($d_{calc}$) exceeds the known reference distance ($d_{known}$) by at least the threshold distance, the central control unit (110) is configured to:
   prompt, via the user interface, an operator to enter input data reflecting whether the intermediate base station (BSI5) is located above or below the common plane.

8. The system according claim 1, wherein the radio transmitter tags (T) are the animal tags (T).

9. A method of determining a location of an intermediate base station (BSI1, BSI2, BSI3, BSI4, BSI5) added to a system for positioning radio transmitter tags (T), the system comprising a central control unit (110) and a set of at least three anchor base stations (BSA1, BSA2, BSA3, BSA4) whose respective positions are known, wherein,
   the anchor base stations (BSA1, BSA2, BSA3, BSA4) in said set of at least three anchor base stations (BSA1, BSA2, BSA3, BSA4) are arranged in a frame around an area in which positions for radio transmitter tags (T) are to be determined based on propagation-delay measurements of signals emitted by the radio transmitter tags (T) using a global time reference (CLK), the anchor base stations being located in a common plane, the method comprising:
   checking whether a notification has been received, which notification indicates that the intermediate base station (BSI5) has been arranged between first and second anchor base stations (BSA1, BSA3) of said set of at least three anchor base stations, such that in a projection onto the common plane, the intermediate base station (BSI5) is located on a straight line between the first and second anchor base stations (BSA1, BSA3); and
   when the notification has been received, determining, based on propagation-delay measurements of a signal emitted by the intermediate base station (BSI5) and using the global time reference (CLK):
   a first calculated distance ($d_{BSA1-BSI5}$) between the first anchor base station (BSA1) and the intermediate base station (BSI5), and
   a second calculated distance ($d_{BSA3-BSI5}$) between the second anchor base station (BSA3) and the intermediate base station (BSI5);
   obtaining an elevation indicator specifying whether the intermediate base station (BSI5) is located:
   (i) in the common plane,
   (ii) above the common plane, or
   (iii) below the common plane, and
   determining the location of the intermediate base station (BSI5) based on the first and second calculated distances ($d_{BSA1-BSI5}$; $d_{BSA3-BSI5}$) and the elevation indicator.

10. The method according claim 9, wherein the determining of the location of the intermediate base station (BSI5) involves calculating a deviation distance ($\Delta e_{BSI5}$) from the common plane using the first and second calculated distances ($d_{BSA1-BSI5}$; $d_{BSA3-BSI5}$), a known reference distance ($d_{BSA1-BDA3}$) between the first and second anchor base stations (BSA1, BSA3), the elevation indicator and applying the Pythagorean theorem.

11. The method according to claim 10, further comprising:
   adding the first and second calculated distances ($d_{BSA1-BSI5}$; $d_{BSA3-BSI5}$) to one another to obtain an overall calculated distance ($d_{calc}$); and
   comparing the overall calculated distance with a known reference distance ($d_{known}$) between the first and second anchor base stations (BSA1, BSA3) and when the overall calculated distance exceeds the known reference distance by less than a threshold distance ($d_{th}$), determining the elevation indicator to specify that the intermediate base station (BSI5) is located in the common plane.

12. The method according to claim 11, wherein when the elevation indicator specifies that the intermediate base station (BSI5) is located in the common plane, the method further comprises:
   determining the location of the intermediate base station (BSI5) based on the known location of one of the first and second anchor base stations (BSA1, BSA3) and the first or second calculated distance ($d_{BSA1-BSI5}$; $d_{BSA3-BSI5}$) between the intermediate base station (BSI5) and said one of the first and second anchor base stations (BSA1, BSA3).

13. The method according to claim 11, wherein, when the overall calculated distance ($d_{calc}$) exceeds the known reference distance ($d_{known}$) by at least the threshold distance, the method further comprises:
   prompting, via a user interface, an operator to enter input data reflecting whether the intermediate base station (BSI5) is located above or below the common plane.

14. The method according to claim 9, further comprising:
   adding the first and second calculated distances ($d_{BSA1-BSI5}$; $d_{BSA3-BSI5}$) to one another to obtain an overall calculated distance ($d_{calc}$); and
   comparing the overall calculated distance with a known reference distance ($d_{known}$) between the first and second anchor base stations (BSA1, BSA3) and when the overall calculated distance exceeds the known reference distance by less than a threshold distance ($d_{th}$), determining the elevation indicator to specify that the intermediate base station (BSI5) is located in the common plane.

15. The method according to claim 14, wherein when the elevation indicator specifies that the intermediate base station (BSI5) is located in the common plane, the method further comprises:

determining the location of the intermediate base station (BSI5) based on the known location of one of the first and second anchor base stations (BSA1, BSA3) and the first or second calculated distance ($d_{BSA1-BSI5}$; $d_{BSA3-BSI5}$) between the intermediate base station (BSI5) and said one of the first and second anchor base stations (BSA1, BSA3).

16. The method according to claim 14, wherein, when the overall calculated distance ($d_{calc}$) exceeds the known reference distance ($d_{known}$) by at least the threshold distance, the method further comprises:

prompting, via a user interface, an operator to enter input data reflecting whether the intermediate base station (BSI5) is located above or below the common plane.

17. A non-volatile data carrier (130) containing a non-transitory computer program (135), the computer program (135) communicatively connected to a processing unit (120), the computer program (135) comprising software that when executed on the processing unit (120) causes the processing unit (120) to perform the method according claim 9.

18. The method according claim 9, wherein the radio transmitter tags (T) are the animal tags (T).

* * * * *